D. H. KAUFMAN.
APPARATUS FOR SEPARATING GREASE FROM SLUSH.

No. 48,559. Patented July 4, 1865.

Witnesses:

Inventor:

UNITED STATES PATENT OFFICE.

DAVID H. KAUFMAN, OF KOKOMO, INDIANA.

IMPROVED APPARATUS FOR SEPARATING GREASE FROM SLUSH.

Specification forming part of Letters Patent No. 48,559, dated July 4, 1865.

*To all whom it may concern:*

Be it known that I, DAVID H. KAUFMAN, of Kokomo, in the county of Howard and State of Indiana, have invented a new and useful Improvement in Apparatus for Separating Grease from Slush; and I do hereby declare the following to be a full, clear, and exact description of the nature, construction, and operation of the same, reference being had to the annexed drawings, making part of this specification, in which—

Figure 1:
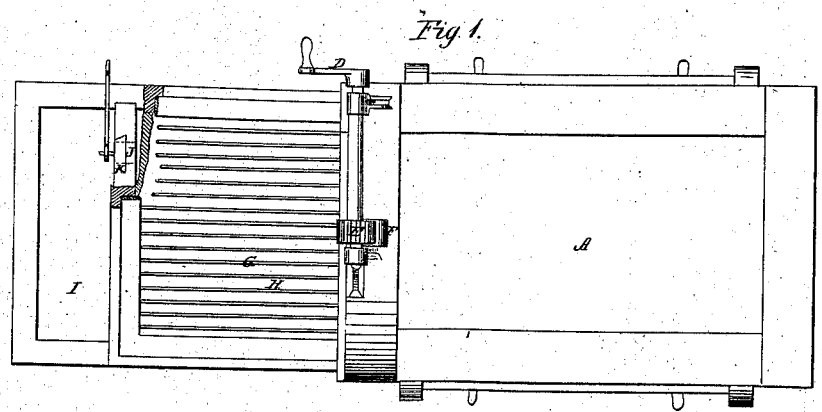
Figure 2:
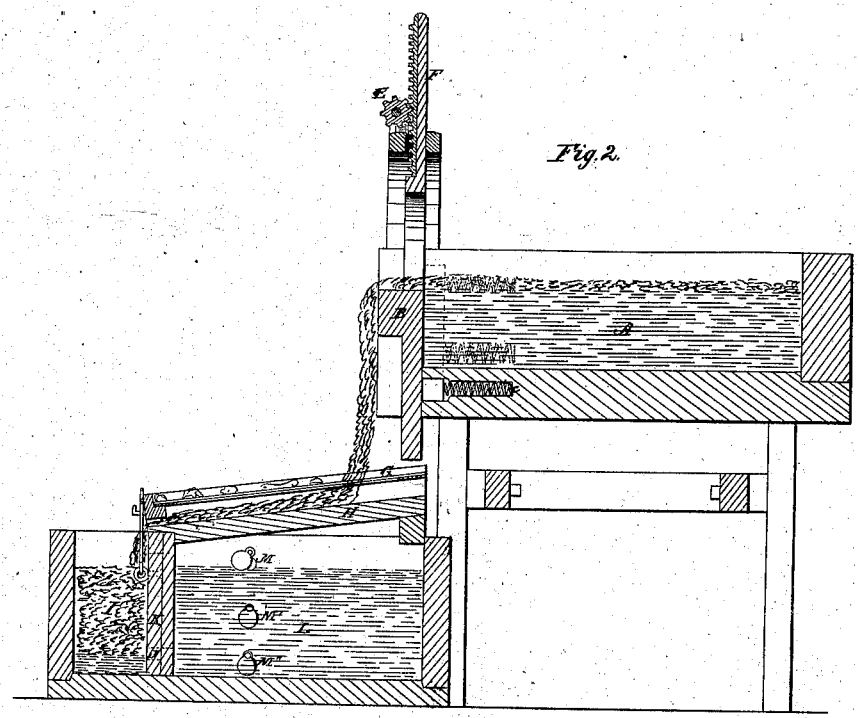

Figure 1 is a plan view, and Fig. 2 a vertical longitudinal section.

Similar letters of reference indicate corresponding parts in the two figures.

The object of this improvement is to separate the contents of the tanks in which the greasy offal of the slaughter-house is rendered, so as to collect the grease which floats upon the slush.

To enable one skilled in the branch of industry to which my invention refers to construct and use the same, I will proceed to describe it.

A is a vat, which receives the contents of the lard-vat or rendering-tank after they have been subjected to the action of heat therein.

B is a gate at the end of the vat, which is provided with springs C and a bearer, and with gum packing to make it water-tight. The gate is raised and lowered by a crank, D, pinion E, and rack F, so as to regulate the amount which flows out to the inclined grating G and board H, the former of which arrests any coarse fatty matter which may have passed from the rendering-tank before it has been perfectly cooked. The latter or board H discharges the fluid into the smaller chamber I of the lower vat, in which the fatty matter, rising to the top by its levity, is retained, while the water at the bottom passes through the opening J, which is regulated by the gate K, into the larger receptacle L, from whence it runs off by either of the openings M M' M'', as may be required.

By means of this apparatus a great deal of handling is saved, and a large percentage of grease recovered, as the fatty fluid collects in the chamber I, from which it is removed from time to time, while the slush passes off continuously to the receptacle adapted to receive it.

Having thus described my invention, what I claim herein as new, and desire to secure by Letters Patent, is—

1. The combined apparatus shown and described, consisting of the upper vat, with its adjusting-gate, the grated incline, and the divided vat I L, with their communicating opening.

2. The vat, with its respective chambers I L communicating at or near the bottom, so as to act as a separator by allowing the lower or watery fluid to pass out of the chamber which retains the grease.

D. H. KAUFMAN.

Witnesses:
J. B. HIGGINS,
G. W. HOOKER.